US012785326B2

(12) United States Patent
Yao

(10) Patent No.: US 12,785,326 B2
(45) Date of Patent: Nov. 3, 2026

(54) ELECTRICAL CONNECTOR WITH HIGH UNLOCKING RELIABILITY

(71) Applicant: DONGGUAN LUXSHARE TECHNOLOGIES CO., LTD, Dongguan City (CN)

(72) Inventor: Kunlin Yao, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 503 days.

(21) Appl. No.: 18/381,083

(22) Filed: Oct. 17, 2023

(65) Prior Publication Data

US 2025/0087938 A1 Mar. 13, 2025

(30) Foreign Application Priority Data

Sep. 7, 2023 (CN) ......................... 202311157325.6

(51) Int. Cl.
*H01R 13/629* (2006.01)
*H01R 13/627* (2006.01)

(52) U.S. Cl.
CPC ... *H01R 13/62916* (2013.01); *H01R 13/6275* (2013.01)

(58) Field of Classification Search
CPC .......... H01R 13/62916; H01R 13/6275; H01R 13/62905; H01R 13/506; H01R 13/6335
USPC .................................................. 439/157, 352
See application file for complete search history.

(56) References Cited

U.S. PATENT DOCUMENTS

| | | | | | |
|---|---|---|---|---|---|
| 6,431,890 | B1 * | 8/2002 | Li | H01R 13/6335 439/325 |
| 9,423,575 | B2 * | 8/2016 | Yang | G02B 6/4261 |
| 10,461,473 | B1 * | 10/2019 | Hsiao | H01R 13/6335 |
| 12,438,303 | B2 * | 10/2025 | Chen | H01R 13/6275 |
| 2019/0058287 | A1 | 2/2019 | Li et al. | |
| 2020/0321727 | A1 * | 10/2020 | Li | H01R 13/6275 |
| 2023/0238741 | A1 * | 7/2023 | Chen | H01R 13/633 439/352 |
| 2025/0047039 | A1 * | 2/2025 | Lai | H01R 13/6335 |

FOREIGN PATENT DOCUMENTS

CN 209266726 U 8/2019

* cited by examiner

*Primary Examiner* — Christopher M Koehler
*Assistant Examiner* — Gregory L Mangot
(74) *Attorney, Agent, or Firm* — Birch, Stewart, Kolasch & Birch, LLP

(57) ABSTRACT

An electrical connector includes an insulating body, a locking member, a pivot rod and an unlocking device. The insulating body defines an installation space. The locking member is at least partially installed in the installation space. The locking member includes a locking arm and a force-receiving portion. The locking arm includes a hook portion configured to be locked with a mating connector. The pivot rod is installed and fixed on the insulating body, and connected with the locking member. The unlocking device is configured to apply a force directly or indirectly to the force-receiving portion, so that the locking arm rotates around the pivot rod to realize unlocking with the mating connector.

18 Claims, 19 Drawing Sheets

ELECTRICAL CONNECTOR WITH HIGH UNLOCKING RELIABILITY

CROSS-REFERENCE TO RELATED APPLICATION

This patent application claims priority of a Chinese Patent Application No. 202311157325.6, filed on Sep. 7, 2023 and titled "ELECTRICAL CONNECTOR", the entire content of which is incorporated herein by reference.

TECHNICAL FIELD

The present disclosure relates to an electrical connector, which belongs to the technical field of connectors.

BACKGROUND

The electrical connector in the related art includes an insulating body, a locking elastic piece installed on the insulating body, and a drawstring connected with the locking elastic piece. The locking elastic piece includes a locking arm configured to be locked with a mating connector and a connecting portion connected with the drawstring.

When it needs to be unlocked, the drawstring pulls the connecting portion, so that a position of the locking elastic piece moves downwardly to disengage from the mating connector.

However, in the related art, the method of realizing unlocking through deformation of the locking elastic piece has low reliability and is prone to adverse phenomena such as jamming.

SUMMARY

An object of the present disclosure is to provide an electrical connector with high unlocking reliability.

In order to achieve the above object, the present disclosure adopts the following technical solution: an electrical connector, including: an insulating body including a wall portion which defines an installation space; a locking member at least partially installed in the installation space; the locking member including a locking arm and a force-receiving portion; the locking arm including a hook portion configured to be locked with a mating connector; a pivot rod installed and fixed to the wall portion and connected with the locking member; and an unlocking device configured to apply a force directly or indirectly to the force-receiving portion, so that the locking arm rotates around the pivot rod to realize unlocking with the mating connector.

In order to achieve the above object, the present disclosure adopts the following technical solution: an electrical connector, including: an insulating body defining a first slot, a second slot and an installation groove communicating with the first slot and the second slot; a locking member including a first base portion, a second base portion opposite to the first base portion, a first locking arm extending forwardly from the first base portion and received in the first slot, a second locking arm extending forwardly from the second base portion and received in the second slot, and a connecting portion connecting the first base portion and the second base portion; the locking member including a force-receiving portion; the first locking arm and the second locking arm including a first hook portion and a second hook portion, respectively, for being locked with a mating connector; a pivot rod connecting the first base portion and the second base portion, the pivot rod being received in the installation groove; and an unlocking device configured to apply a force directly or indirectly to the force-receiving portion, so that the first locking arm and the second locking arm rotate around the pivot rod to realize unlocking with the mating connector.

Compared with the prior art, the electrical connector of the present disclosure includes the pivot rod, and the locking arm can rotate around the pivot rod, so as to realize unlocking with the mating connector. This rotary unlocking method greatly reduces the risk of jamming and improves the reliability of unlocking.

DETAILED DESCRIPTION

Figure 1:
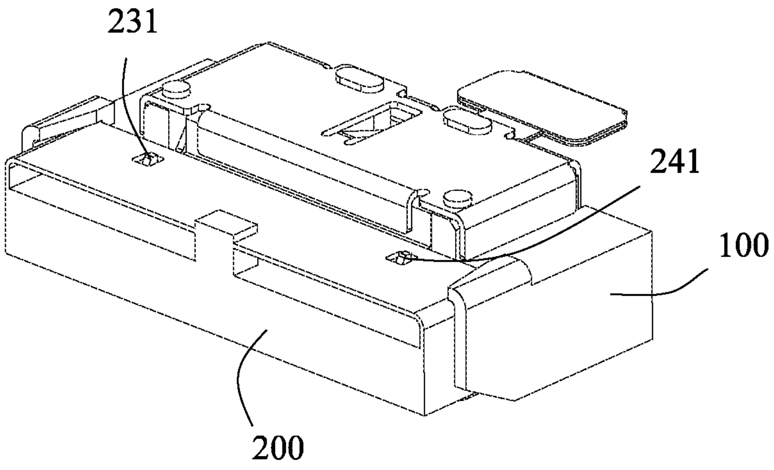
FIG. 1 is a schematic perspective view of a connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
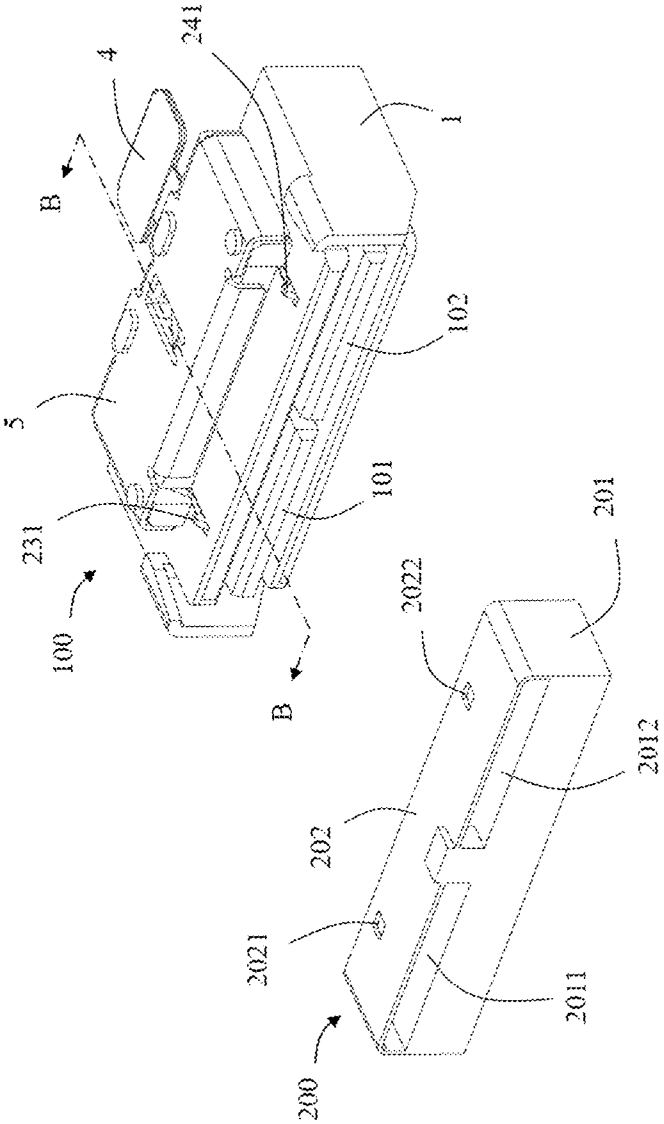
FIG. 2 is a partial perspective exploded view of FIG. 1.
Figure 3:
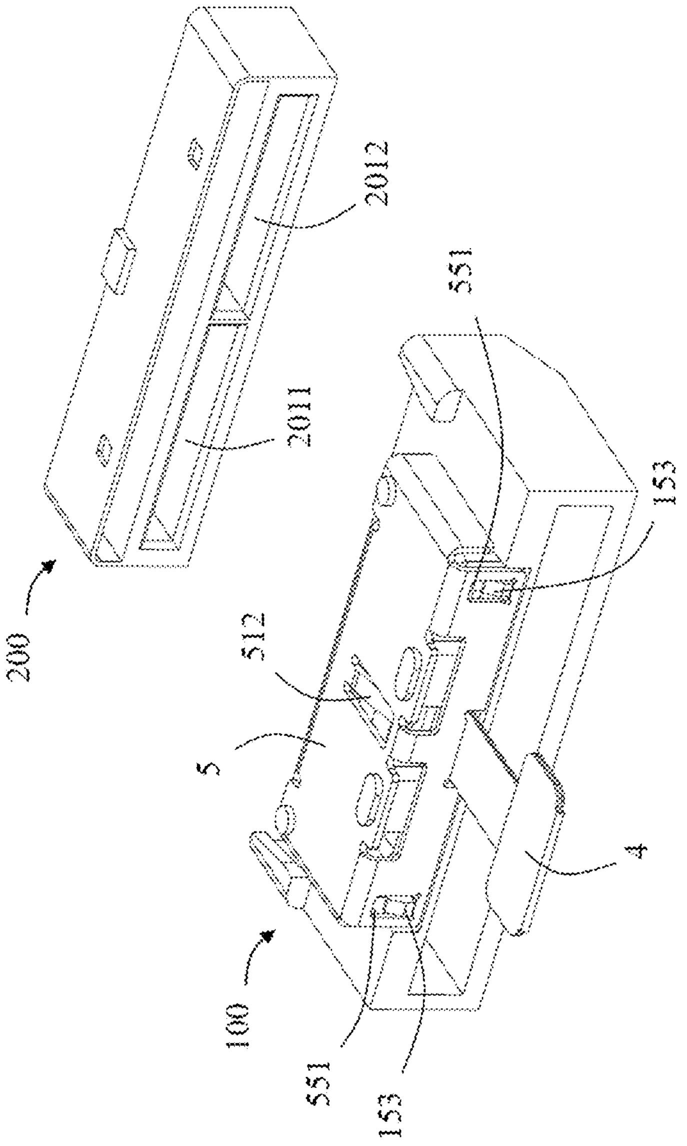
FIG. 3 is a partial perspective exploded view of FIG. 2 from another angle.
Figure 4:
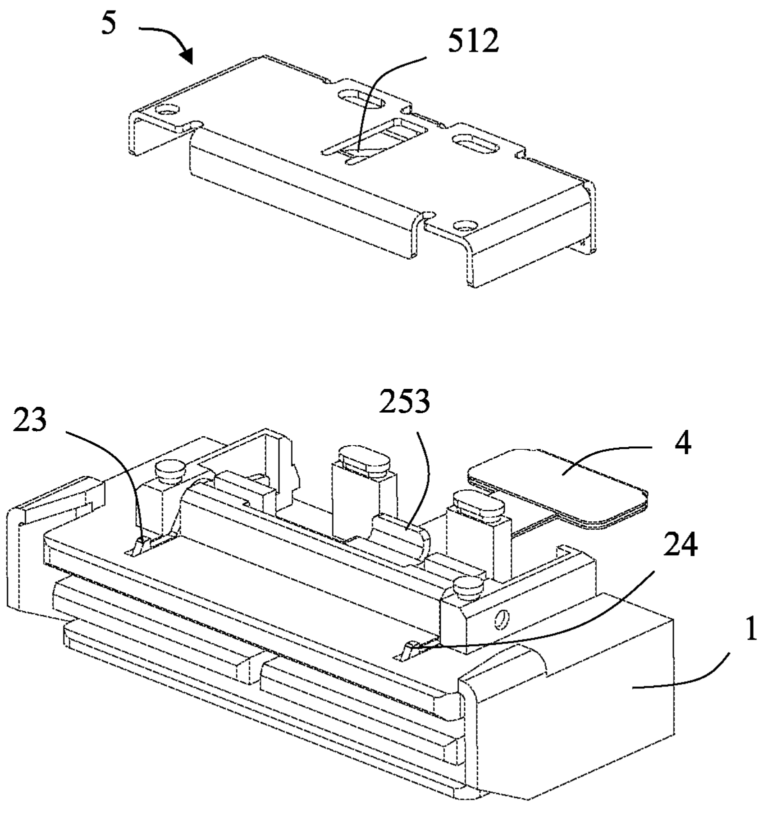
FIG. 4 is a partial perspective exploded view of the electrical connector in accordance with a first embodiment of the present disclosure.
Figure 5:
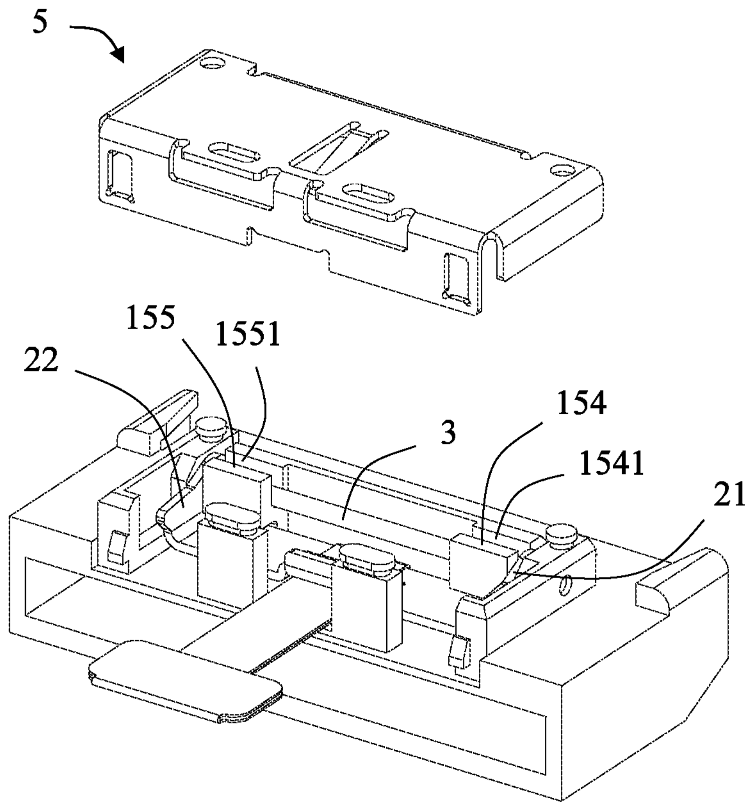
FIG. 5 is a partial perspective exploded view of FIG. 4 from another angle.
Figure 6:
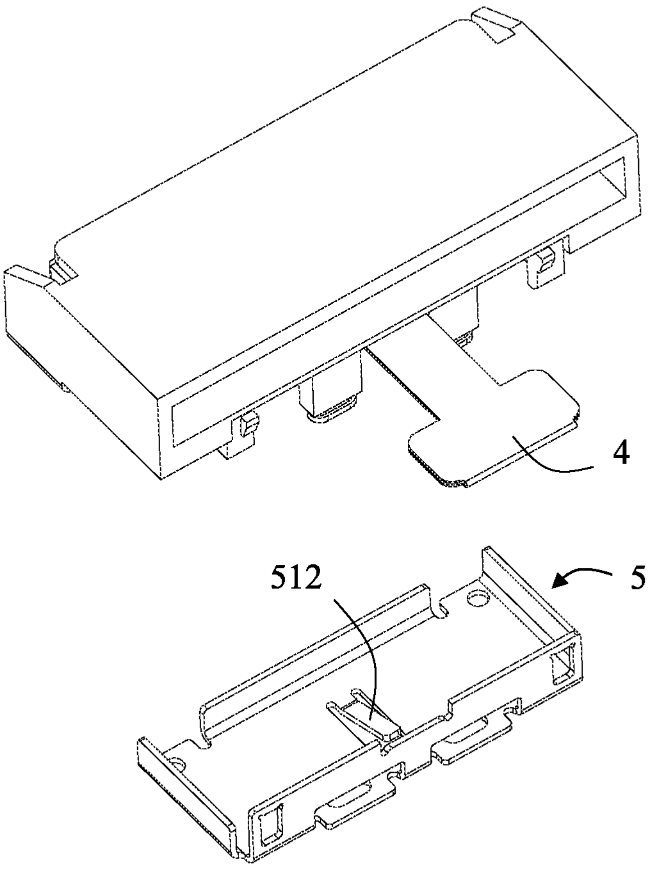
FIG. 6 is a partial perspective exploded view of FIG. 5 from another angle.
Figure 7:
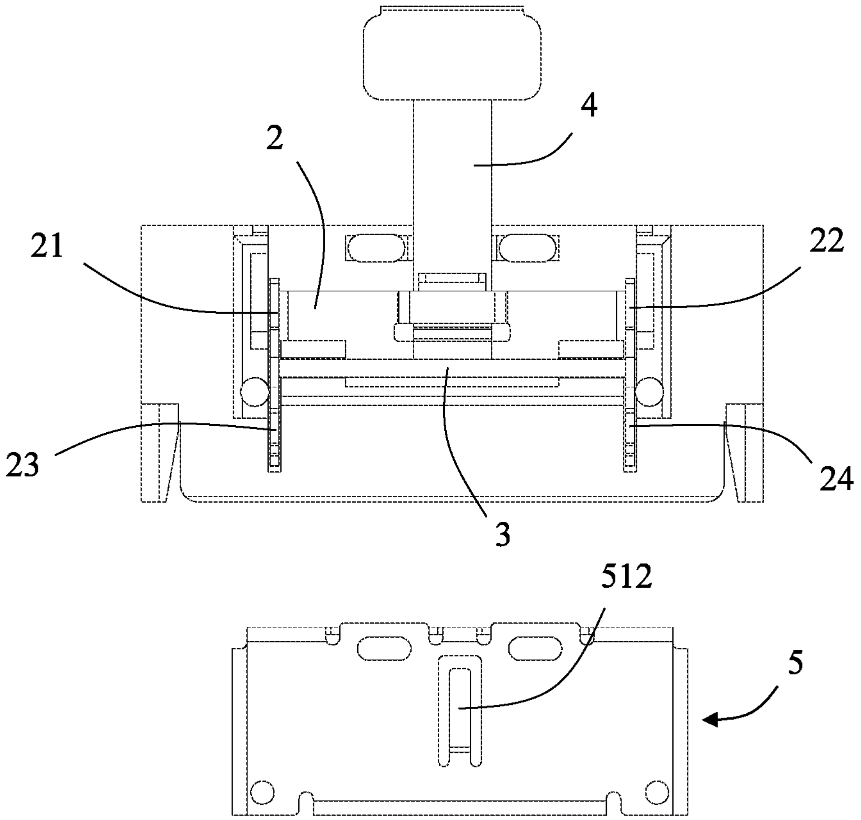
FIG. 7 is a top view of FIG. 4.

Referring to FIG. 1 to FIG. 3, the present disclosure discloses a connector assembly which includes an electrical connector 100 and a mating connector 200 for mating with the electrical connector 100. In one embodiment of the present disclosure, the electrical connector 100 is a plug connector, and the mating connector 200 is a receptacle connector.

The mating connector 200 includes a mating insulating body 201 and a mating shell 202. The mating insulating body 201 includes a first insertion slot 2011 and a second insertion slot 2012 which are disposed side by side with the first insertion slot 2011 along a left-right direction. The mating shell 202 is located above the first insertion slot 2011 and the second insertion slot 2012. The mating shell 202 includes a first locking hole 2021 communicating with the first insertion slot 2011 and a second locking hole 2022 communicating with the second insertion slot 2012.

Referring to FIG. 4 to FIG. 13, the electrical connector 100 includes an insulating body 1, a locking member 2 installed on the insulating body 1, a pivot rod 3 mated with the locking member 2, an unlocking device 4 mating with the locking member 2, and a cover plate 5 installed on the insulating body 1. The unlocking device 4 is configured to directly or indirectly exert force on the locking member 2, so as to make the locking member 2 rotate around the pivot rod 3, thereby realizing unlocking with the mating connector 200.

Figure 8:
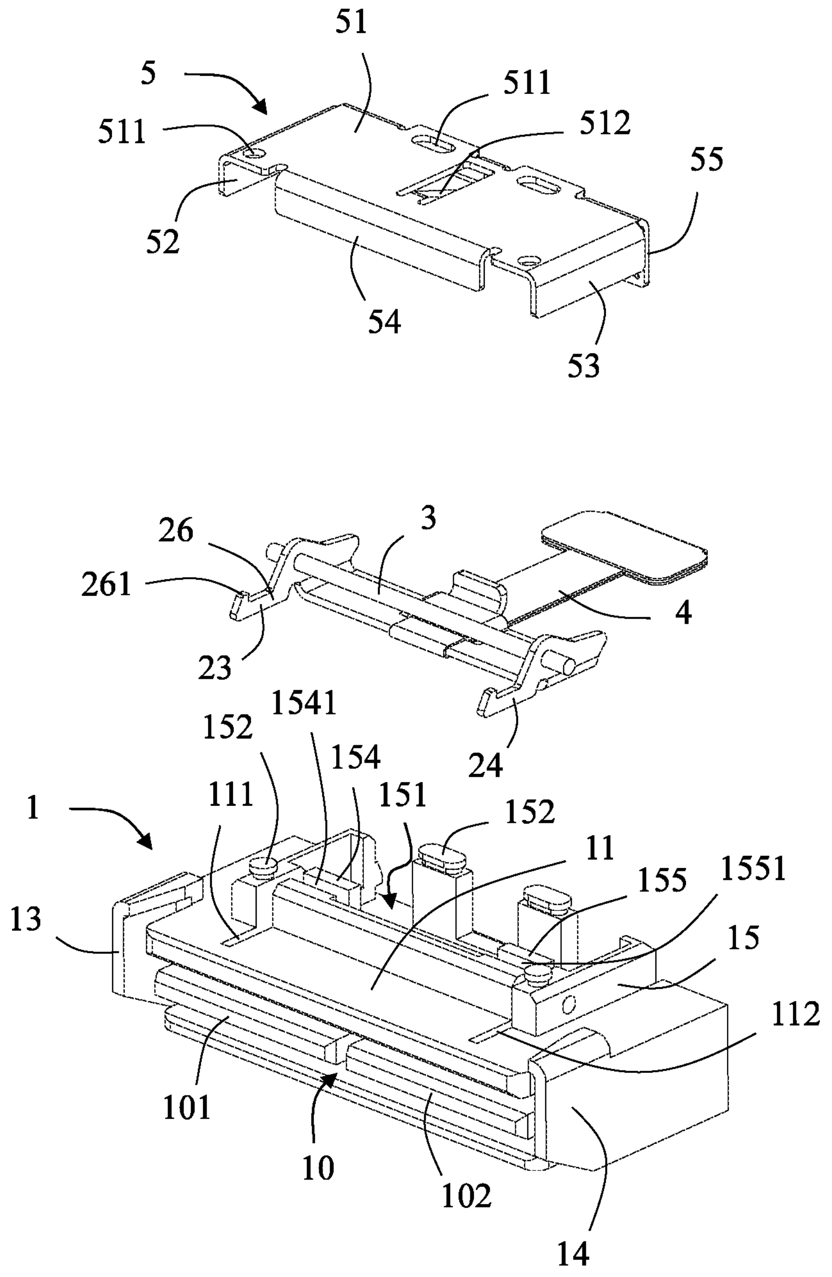
FIG. 8 is a further partial perspective exploded view of FIG. 4.

Referring to FIG. 8, the insulating body 1 includes a plurality of wall portions which include a top wall 11, a bottom wall 12, a first side wall 13 and a second side wall 14. In the illustrated embodiment of the present disclosure, the insulating body 1 further includes a receiving groove 10. The electrical connector 100 includes a first tongue plate 101 and a second tongue plate 102 protruding into the receiving groove 10. The receiving groove 10 is located between the top wall 11 and the bottom wall 12 in a vertical direction. The receiving groove 10 is located between the first side wall 13 and the second side wall 14 in the left-right direction. The first tongue plate 101 and the second tongue plate 102 are arranged side by side along the left-right direction. At least one surface of the first tongue plate 101 and at least one surface of the second tongue plate 102 are provided with a plurality of conductive pads (not shown). When the mating connector 200 is mated with the electrical connector 100, the first tongue plate 101 and the second tongue plate 102 are inserted in the first insertion slot 2011 and the second insertion slot 2012, respectively. The conductive pads are in contact with conductive terminals of the mating connector 200.

In the illustrated embodiment of the present disclosure, the top wall 11 of the insulating body 1 defines a first slot 111 and a second slot 112. The first slot 111 and the second slot 112 are parallel to each other and both extend along a front-rear direction. The insulating body 1 is further includes a raised portion 15 protruding upwardly from the top wall 11. The raised portion 15 defines a downwardly recessed installation space 151 for at least partially receiving the locking member 2. The raised portion 15 is further includes a plurality of positioning posts 152 protruding upwardly. The plurality of positioning posts 152 are used to fix the cover plate 5.

Figure 9:
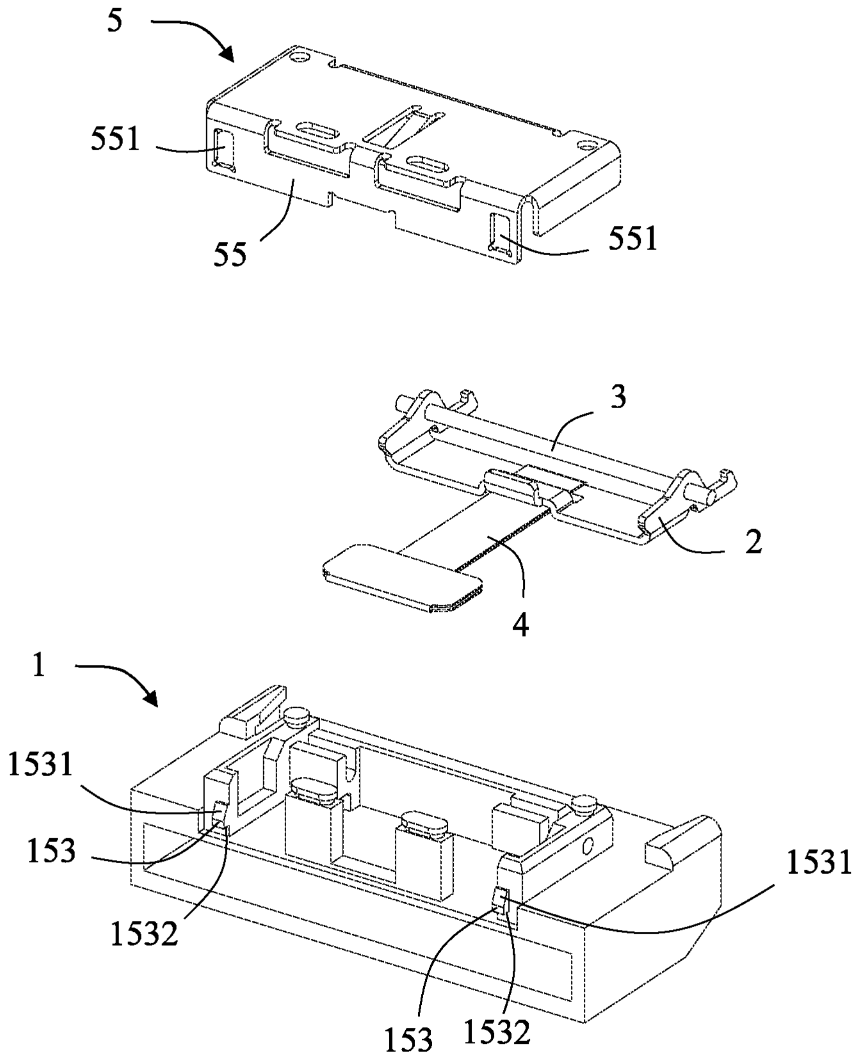
FIG. 9 is a partial perspective exploded view of FIG. 8 from another angle.
Figure 10:
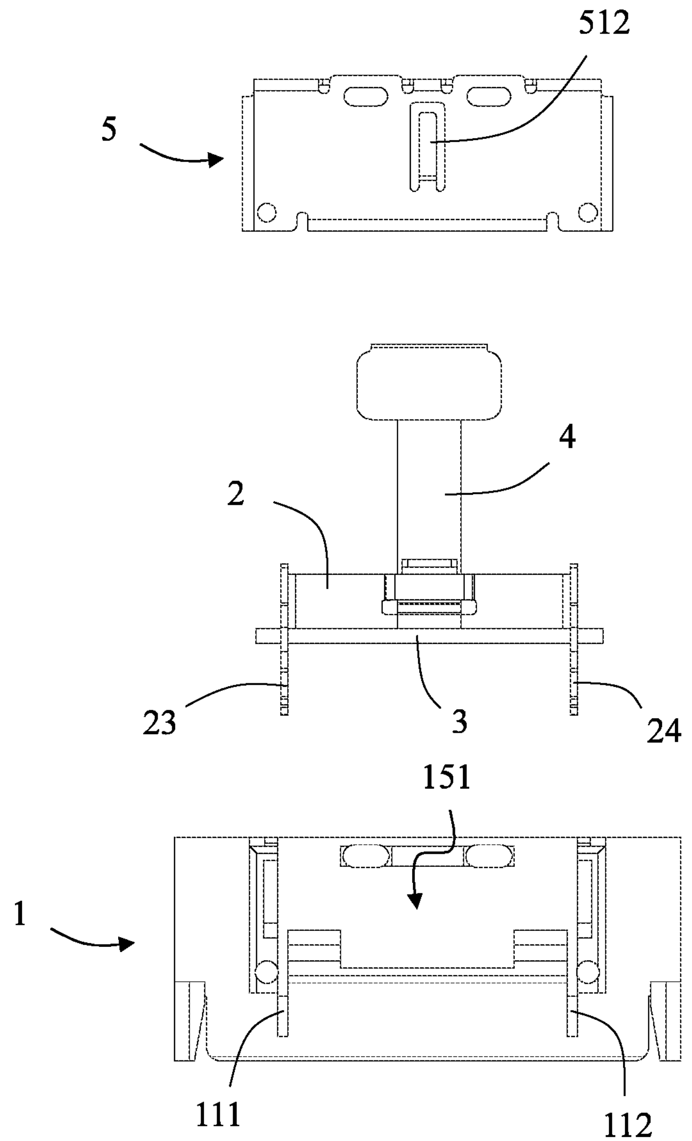
FIG. 10 is a top view of FIG. 8.

As shown in FIG. 9, a plurality of locking blocks 153 protruding backwardly are provided on a rear end surface of the raised portion 15. Each locking block 153 has a guiding inclined surface 1531 and a locking surface 1532 at a bottom of the guiding inclined surface 1531. As shown in FIG. 8, the raised portion 15 is further provided with a first installation block 154 and a second installation block 155. The first installation block 154 defines a first installation groove 1541 extending along the left-right direction. The second installation block 155 defines a second installation groove 1551 extending along the left-right direction. In the illustrated embodiment of the present disclosure, the first installation groove 1541 and the second installation groove 1551 are aligned along the left-right direction.

As shown in FIG. 8, the cover plate 5 includes a top end wall 51, a first bent wall 52 bent downwardly from one end (for example, a left end) of the top end wall 51, a second bent wall 53 bent downwardly from another end (for example, a right end) of the top end wall 51, a front end wall 54 bent downwardly from a front end of the top end wall 51, and a rear end wall 55 bent downwardly from a rear end of the top end wall 51. The top end wall 51 defines a plurality of positioning holes 511 for mating with the plurality of positioning posts 152. It is understandable to those skilled in the art that, after the positioning posts 152 pass through corresponding positioning holes 511, the bonding tightness between the positioning posts 152 and the positioning holes 511 can be improved by heat melting or the like. In the illustrated embodiment of the present disclosure, the top end wall 51 is further provided with a downwardly protruding abutting elastic arm 512. In the illustrated embodiment of the present disclosure, the cover plate 5 is made of sheet metal. The abutting elastic arm 512 is punched downwardly from the top end wall 51. The abutting elastic arm 512 is in of a cantilever-shaped configuration with a free end, so as to improve the elastic deformation capability of the abutting elastic arm 512.

The first bent wall 52, the second bent wall 53, the front end wall 54 and the rear end wall 55 abut against a left end surface, a right end surface, a front end surface and a rear face of the raised portion 15, respectively. Besides, the rear end wall 55 defines a plurality of locking holes 551 mating with the locking blocks 153. The guiding inclined surface 1531 is used to guide the installation of the cover plate 5. After the cover plate 5 is installed in place, the locking blocks 153 are located in corresponding locking holes 551. A bottom of each locking hole 551 cooperates with the locking surface 1532 to prevent the cover plate 5 from detaching from the insulating body 1.

Figure 11:
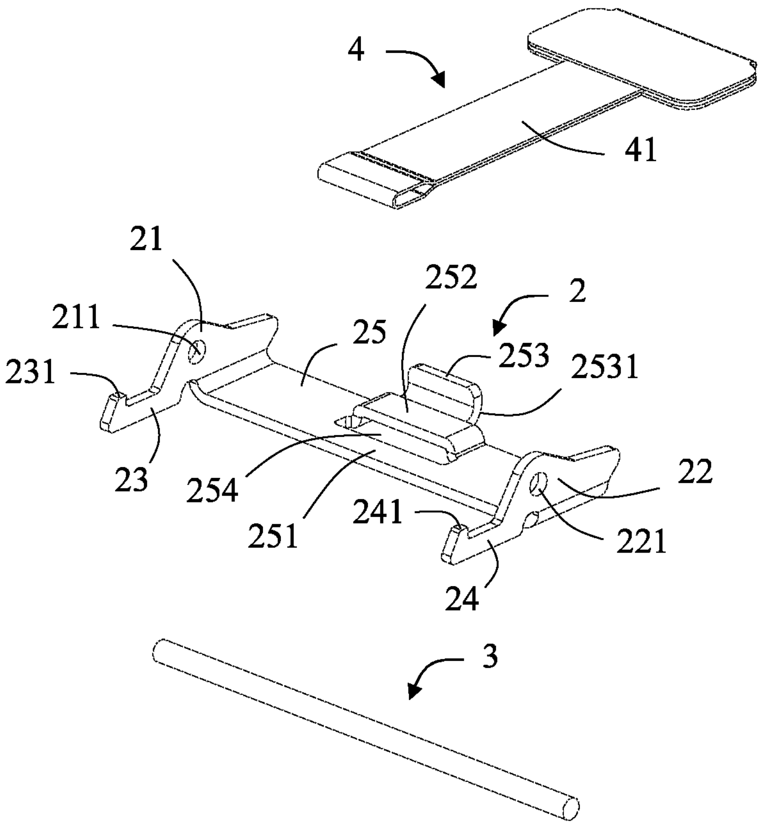
FIG. 11 is a perspective exploded view of a locking member, a pivot rod and an unlocking device in FIG. 8.
Figure 12:
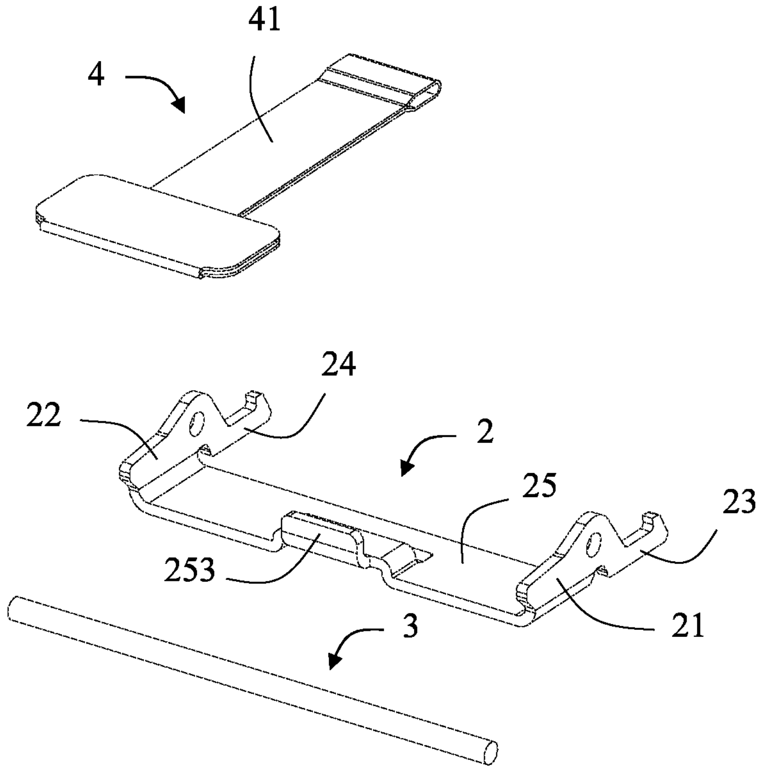
FIG. 12 is a perspective exploded view of FIG. 11 from another angle.
Figure 13:
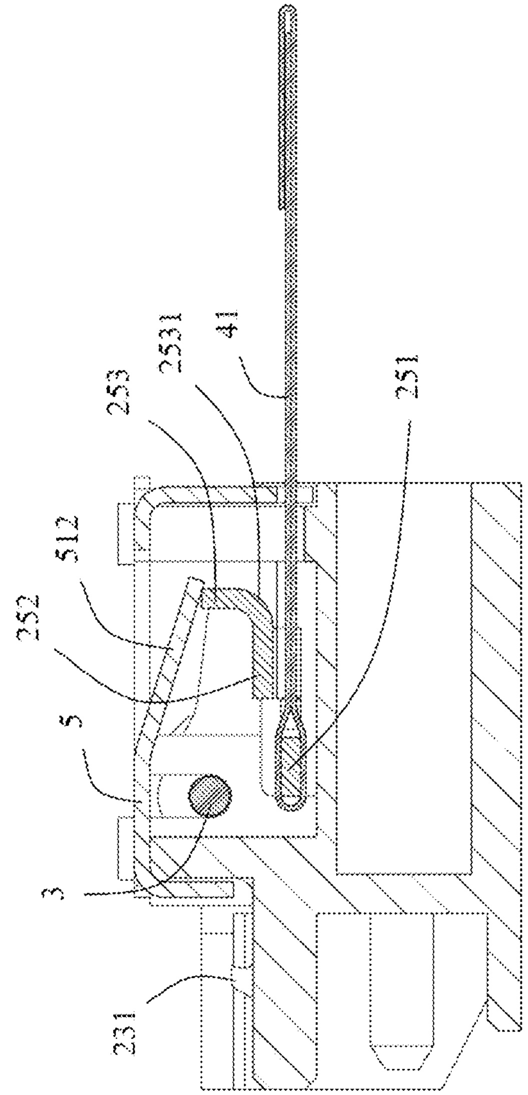
FIG. 13 is a schematic sectional view taken along line B-B in FIG. 2.
Figure 14:
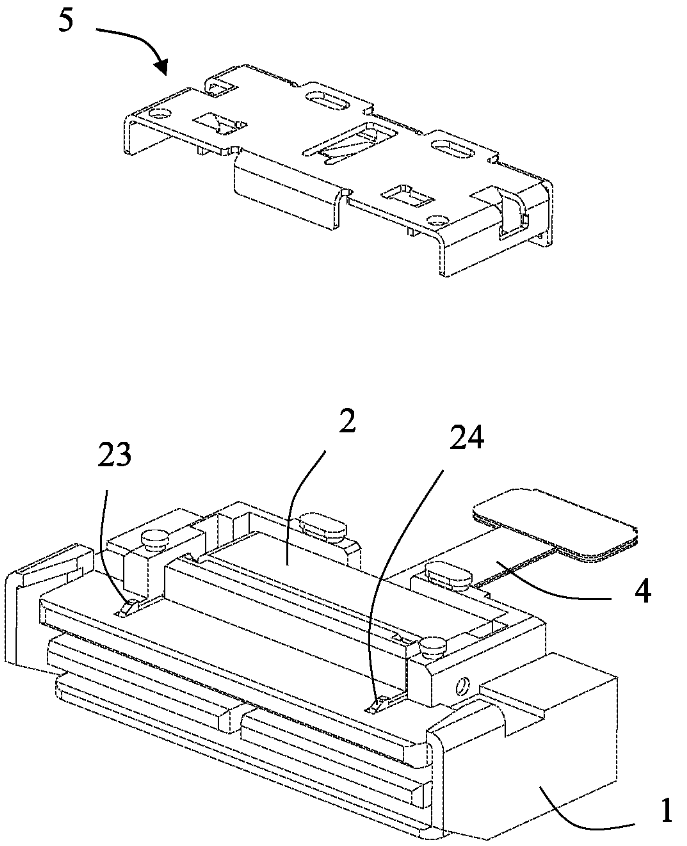
FIG. 14 is a partial perspective exploded view of the electrical connector in accordance with a second embodiment of the present disclosure.
Figure 15:
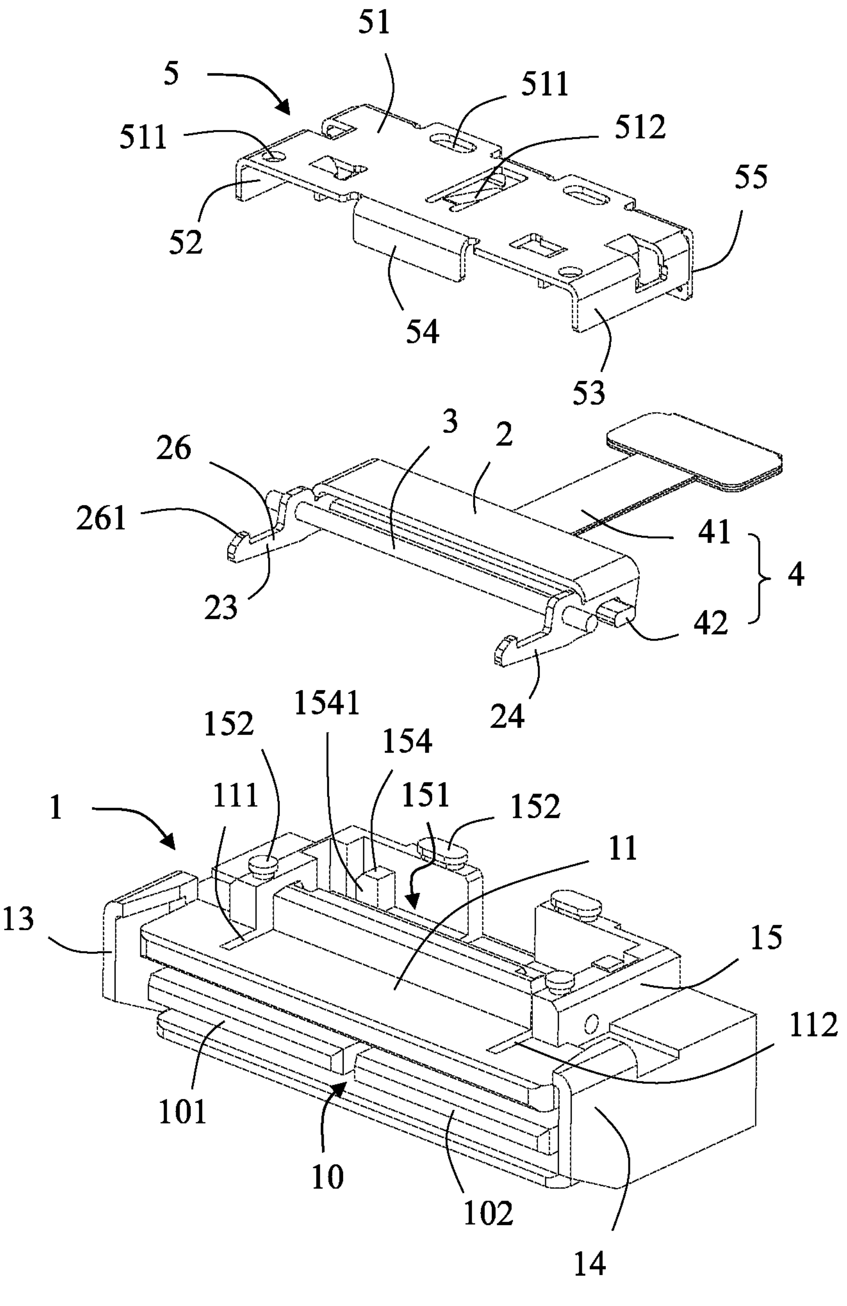
FIG. 15 is a further partial perspective exploded view of FIG. 14.
Figure 16:
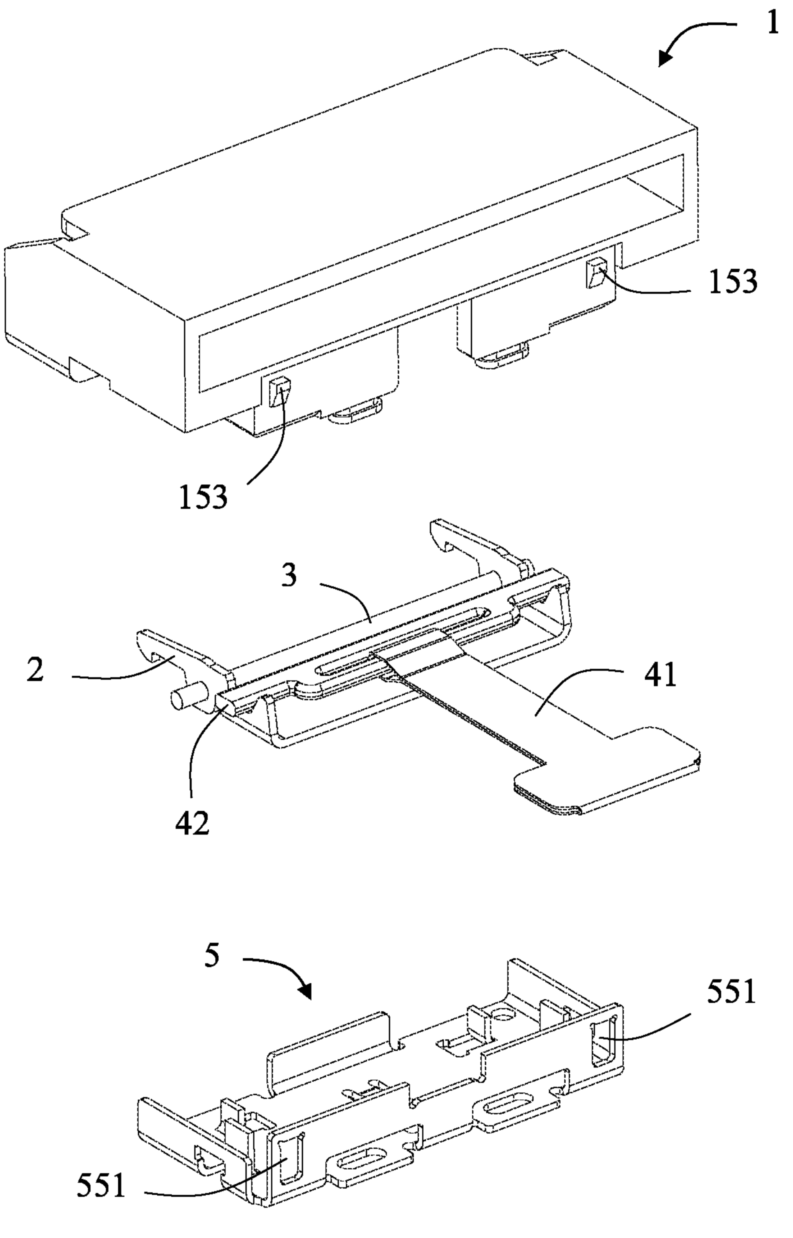
FIG. 16 is a partial perspective exploded view of FIG. 15 from another angle.
Figure 17:
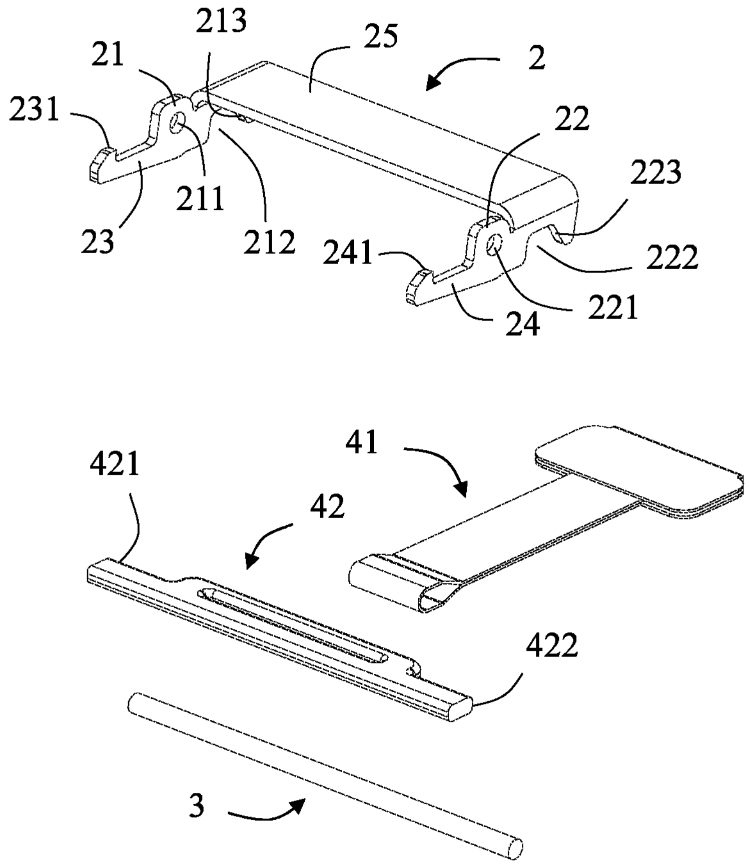
FIG. 17 is a perspective exploded view of a locking member, a pivot rod and an unlocking device in FIG. 15.
Figure 18:
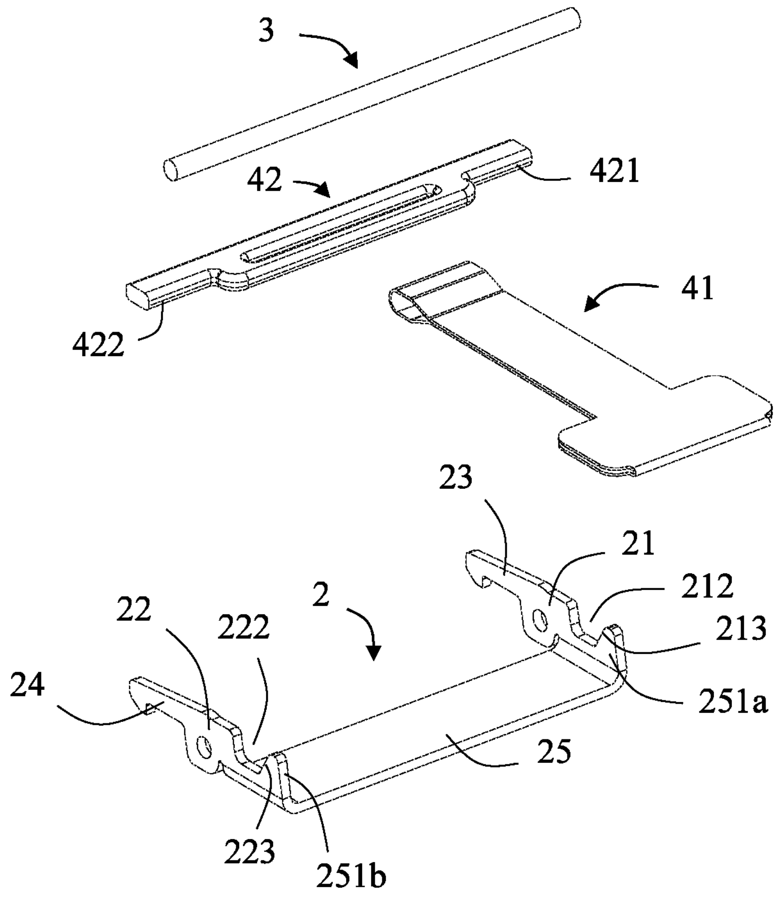
FIG. 18 is an exploded perspective view of FIG. 17 from another angle.
Figure 19:
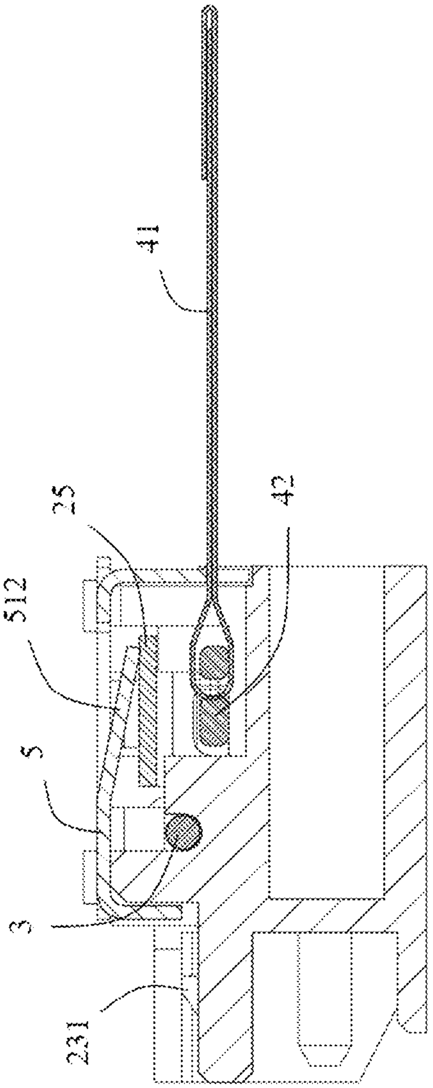
FIG. 19 is a schematic cross-sectional view of the electrical connector in accordance with the second embodiment of the present disclosure along a certain section.

Referring to FIG. 11 to FIG. 13, in a first embodiment illustrated in the present disclosure, the locking member 2 includes a first base portion 21, a second base portion 22 opposite to the first base portion 21, a first locking arm 23 extending forwardly from the first base portion 21, a second locking arm 24 extending forwardly from the second base portion 22, and a connecting portion 25 connecting the first base portion 21 and the second base portion 22. In the illustrated embodiment of the present disclosure, the locking member 2 is made of sheet metal by blanking.

The first base portion 21 is located in the vertical plane. The first base portion 21 defines a first installation hole 211 extending therethrough along the left-right direction.

The second base portion 22 is located in the vertical plane. The second base portion 22 defines a second installation hole 221 extending therethrough along the left-right direction.

The first locking arm 23 is located in the vertical plane and is formed by blanking, so as to improve the structural strength of the first locking arm 23. The first locking arm 23 is received in the first slot 111. The first locking arm 23 includes a first hook portion 231 located at a front end thereof. The first hook portion 231 is used to cooperate with the first locking hole 2021 to achieve locking between the electrical connector 100 and the mating connector 200.

Similarly, the second locking arm 24 is located in the vertical plane and is formed by blanking to improve the structural strength of the second locking arm 24. The second locking arm 24 is received in the second slot 112. The second locking arm 24 includes a second hook portion 241 located at a front end thereof. The second hook portion 241 is used to cooperate with the second locking hole 2022 to achieve locking between the electrical connector 100 and the mating connector 200.

The pivot rod 3 is cylindrical. One end of the pivot rod 3 passes through the first installation hole 211, and the other end of the pivot rod 3 passes through the second installation hole 221, so that the pivot rod 3 is installed to the first base portion 21 and the second base portion 22. One side of the pivot rod 3 is fixed in the first installation groove 1541, and the other side of the pivot rod 3 is fixed in the second installation groove 1551.

In the first embodiment shown in the present disclosure, the connecting portion 25 connects a bottom of the first base portion 21 and a bottom of the second base portion 22. The pivot rod 3 is located above the connecting portion 25. The connecting portion 25 includes a force-receiving portion 251, a raised portion 252 located at a rear end of the force-receiving portion 251, and an abutment protrusion 253 extending upwardly from the raised portion 252.

In the first embodiment shown in the present disclosure, the unlocking device 4 includes a drawstring 41 connected to the force-receiving portion 251. The drawstring 41 passes through the insulating body 1 backwardly from a bottom of the raised portion 252.

In the illustrated embodiment of the present disclosure, the abutment protrusion 253 is bent upwardly from a rear end edge of the raised portion 252. The abutment protrusion 253 includes an arc-shaped surface 2531 mated with the drawstring 41 in order to prevent the drawstring 41 from being scratched when it is pulled. The abutting elastic arm 512 is configured to press against the abutment protrusion 253 of the locking member 2 when in an unlocked position, so as to apply force to the locking member 2. Of course, it is understandable to those skilled in the art that, even in the locking position, the abutting elastic arm 512 is pressed against the abutment protrusion 253 of the locking member 2 to apply a certain force to the locking member 2. As a result, it prevents the electrical connector 100 and the mating connector 200 from being in an improper unlocked state due to the pulling of the drawstring 41 not due to the unlocking force.

In addition, the connecting portion 25 defines a relief groove 254 between the force-receiving portion 251 and the raised portion 252. A width of the relief groove 254 is greater than a width of the raised portion 252, so as to fasten the drawstring 41 to the force-receiving portion 251, and it is beneficial to provide enough space for the drawstring 41 to pass through the raised portion 252.

It is understandable to those skilled in the art that when the mating connector 200 and the electrical connector 100 are plugged in place, the first hook portion 231 of the first locking arm 23 is locked with the first locking hole 2021; and the second hook portion 241 of the second locking arm 24 is locked with the second locking hole 2022.

When unlocking is required, a backward pulling force is applied to the drawstring 41. At this moment, the force-receiving portion 251 is pulled backwardly, thereby driving the locking member 2 to rotate around the pivot rod 3. Specifically, the first locking arm 23 and the second locking arm 24 rotate downwardly around the pivot rod 3 as a rotation axis. At this time, the positions of the first hook portion 231 of the first locking arm 23 and the second hook portion 241 of the second locking arm 24 are lowered, so that they are separated from the first locking hole 2021 and the second locking hole 2022. At this time, the mating connector 200 and the electrical connector 100 are in an unlocked state capable of being separated from each other. It is understandable to those skilled in the art that, according to the principle of leverage, when the first locking arm 23 and the second locking arm 24 rotate downwardly around the pivot rod 3 as the rotation axis, the abutment protrusion 253 rotates upwardly and abuts against the abutting elastic arm 512.

FIG. 14 to FIG. 19 disclose a specific structure of the electrical connector 100 in accordance with a second embodiment of the present disclosure, wherein a corresponding structure of the electrical connector 100 in the second embodiment of the present disclosure can refer to the description of the electrical connector 100 in the first embodiment of the present disclosure. Only the main differences between the two are described below.

Referring to FIG. 14 to FIG. 19, in the second embodiment of the electrical connector 100 of the present disclosure, the locking member 2 includes a first base portion 21, a second base portion 22 opposite to the first base portion 21, a first locking arm 23 extending forwardly from the first base portion 21, a second locking arm 24 extending forwardly from the second base portion 22, and a connecting portion 25 connecting the first base portion 21 and the second base portion 22.

The first base portion 21 is located in the vertical plane. The first base portion 21 defines a first installation hole 211 extending therethrough along the left-right direction. The first base portion 21 defines a first notch 212 located behind the first locking arm 23 and a first force-receiving portion 251*a* located at a rear end of the first notch 212. The first force-receiving portion 251*a* includes a first abutment inclined surface 213 exposed in the first notch 212. The first abutment inclined surface 213 slopes backwardly and downwardly.

The second base portion 22 is located in the vertical plane. The second base portion 22 defines a second installation hole 221 extending therethrough along the left-right direction. The second base portion 22 defines a second notch 222 located behind the second locking arm 24 and a second force-receiving portion 251*b* located at a rear end of the second notch 222. The second force-receiving portion 251*b* includes a second abutment inclined surface 223 exposed in the second notch 222. The second abutment inclined surface 223 slopes backwardly and downwardly.

The first locking arm 23 is located in the vertical plane and is formed by blanking, in order to improve the structural strength of the first locking arm 23. The first locking arm 23 is received in the first slot 111. The first locking arm 23 includes a first hook portion 231 located at a front end thereof. The first hook portion 231 is used to mate with the first locking hole 2021, in order to achieve locking between the electrical connector 100 and the mating connector 200.

Similarly, the second locking arm 24 is located in the vertical plane and is formed by blanking, in order to improve the structural strength of the second locking arm 24. The second locking arm 24 is received in the second slot 112. The second locking arm 24 includes a second hook portion 241 located at a front end thereof. The second hook portion 241 is used to mate with the second locking hole 2022, in order to achieve locking between the electrical connector 100 and the mating connector 200.

The pivot rod 3 is cylindrical. One end of the pivot rod 3 passes through the first installation hole 211, and the other end of the pivot rod 3 passes through the second installation hole 221, so that the pivot rod 3 is installed to the first base portion 21 and the second base portion 22. One side of the pivot rod 3 is fixed in the first installation groove 1541, and the other side of the pivot rod 3 is fixed in the second installation groove 1551.

In the second embodiment shown in the present disclosure, the unlocking device 4 includes a slider 42 received in the first notch 212 and the second notch 222, and a drawstring 41 connected to the slider 42. The drawstring 41 is tied to a rear end of the slider 42. The drawstring 41 passes through the insulating body 1 backwardly. The slider 42 includes a first arc-shaped surface 421 configured to abut against the first abutment inclined surface 213 and a second arc-shaped surface 422 abutting against the second abutment inclined surface 223. The slider 42 is movable relative to the first abutment inclined surface 213 and the second abutment inclined surface 223 driven by the drawstring 41, so as to make the first locking arm 23 and the second locking arm 24 rotate around the pivot rod 3, thereby realizing unlocking with the mating connector 200.

The abutting elastic arm 512 is configured to press against the connecting portion 25 of the locking member 2 in the unlocked position, so as to apply force to the locking member 2. Of course, it is understandable to those skilled in the art that, even in the locked position, the abutting elastic arm 512 also presses against the connecting portion 25 of the locking member 2 to apply a certain force to the locking member 2. As a result, it prevents the electrical connector 100 and the mating connector 200 from being in an improper unlocked state due to the pulling of the drawstring 41 not due to the unlocking force.

It is understandable to those skilled in the art that when the mating connector 200 and the electrical connector 100 are plugged in place, the first hook portion 231 of the first locking arm 23 is locked with the first locking hole 2021; and the second hook portion 241 of the second locking arm 24 is locked with the second locking hole 2022.

When unlocking is required, a backward pulling force is applied to the drawstring 41; the slider 42 moves backwardly under the action of the drawstring 41. The first arc-shaped surface 421 and the second arc-shaped surface 422 of the slider 42 abut against the first abutment inclined surface 213 and the second abutment inclined surface 223, and generate relative motion with respect to the first abutment inclined surface 213 and the second abutment inclined surface 223. Since the slider 42 can only translate backwardly, under the action of the first abutment inclined surface 213 and the second abutment inclined surface 223, the rear end of the first base portion 21 and the rear end of the second base portion 22 are lifted up, thereby driving the locking member 2 to rotate around the pivot rod 3. Specifically, the first locking arm 23 and the second locking arm 24 rotate downwardly around the pivot rod 3 as a rotation axis. At this time, the positions of the first hook portion 231 of the first locking arm 23 and the second hook portion 241 of the second locking arm 24 are lowered, so as to disengage from the first locking hole 2021 and the second locking hole 2022. At this time, the mating connector 200 and the electrical connector 100 are in an unlocked state capable of being separated from each other. It is understandable to those skilled in the art that, according to the principle of leverage, when the first locking arm 23 and the second locking arm 24 rotate downwardly around the pivot rod 3 as the rotation axis, the connecting portion 25 rotates upwardly and abuts against the abutting elastic arm 512.

It should be noted that, in the illustrated embodiment of the present disclosure, a superordinate concept of the first locking arm 23 and the second locking arm 24 is a locking arm 26; a superordinate concept of the first hook portion 231 and the second hook portion 241 is a hook portion 261; and a superordinate concept of the first force-receiving portion 251*a* and the second force-receiving portion 251*b* is a force-receiving portion 251.

Compared with the prior art, the electrical connector 100 of the present disclosure is provided with the pivot rod 3, and the locking arm 26 can rotate around the pivot rod 3, thereby realizing unlocking with the mating connector 200. This rotary unlocking method greatly reduces the risk of jamming and improves the reliability of unlocking.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body comprising a wall portion which defines an installation space;

a locking member at least partially installed in the installation space; the locking member comprising a locking arm and a force-receiving portion; the locking arm comprising a hook portion configured to be locked with a mating connector;

a pivot rod installed and fixed to the wall portion and connected with the locking member; and an unlocking device configured to apply a force directly or indirectly to the force-receiving portion, so that the locking arm rotates around the pivot rod to realize unlocking with the mating connector;

wherein the locking member comprises a first base portion, a second base portion opposite to the first base portion, and a connecting portion connecting the first base portion and the second base portion; the connecting portion comprises a raised portion and a relief groove; and a width of the relief groove is greater than a width of the raised portion.

2. The electrical connector according to claim 1, wherein the locking arm comprises a first locking arm extending forwardly from the first base portion and a second locking arm extending forwardly from the second base portion; and wherein the wall portion defines a first slot to receive the first locking arm and a second slot to receive the second locking arm.

3. The electrical connector according to claim 2, wherein the first base portion defines a first installation hole; the second base portion defines a second installation hole; one end of the pivot rod passes through the first installation hole, and another end of the pivot rod passes through the second installation hole.

4. The electrical connector according to claim 3, wherein the wall portion comprises a first installation block and a second installation block; the first installation block defines a first installation groove; the second installation block defines a second installation groove; one side of the pivot rod is installed and fixed in the first installation groove, and another side of the pivot rod is installed and fixed in the second installation groove.

5. The electrical connector according to claim 3, wherein both the first locking arm and the second locking arm are located in a vertical plane and formed by blanking.

6. The electrical connector according to claim 3, wherein the connecting portion connects a bottom of the first base portion and a bottom of the second base portion; the pivot rod is located above the connecting portion.

7. The electrical connector according to claim 3, wherein the connecting portion comprises the force-receiving portion; the unlocking device comprises a drawstring connected to the force-receiving portion.

8. The electrical connector according to claim 7, wherein the raised portion is located at a rear end of the force-receiving portion; the connecting portion further comprises an abutment protrusion extending upwardly from the raised portion; the drawstring passes through the insulating body backwardly from a bottom of the raised portion.

9. The electrical connector according to claim 8, wherein the abutment protrusion is bent upwardly from a rear end edge of the raised portion; the abutment protrusion comprises an arc-shaped surface to mate with the drawstring.

10. The electrical connector according to claim 3, wherein the connecting portion connects a top of the first base portion and a top of the second base portion; the pivot rod is located at a front bottom of the connecting portion.

11. The electrical connector according to claim 10, wherein the first base portion defines a first notch located behind the first locking arm and a first abutment inclined surface exposed in the first notch;

the second base portion defines a second notch located behind the second locking arm and a second abutment inclined surface exposed in the second notch; the first abutment inclined surface and the second abutment inclined surface are inclined backwardly and downwardly;

the unlocking device comprises a slider received in the first notch and the second notch, and a drawstring connected to the slider.

12. The electrical connector according to claim 11, wherein the slider comprises a first arc-shaped surface configured to abut against the first abutment inclined surface and a second arc-shaped surface configured to abut against the second abutment inclined surface; the slider is movable relative to the first abutment inclined surface and the second abutment inclined surface driven by the drawstring, so that the locking arm is rotated around the pivot rod to realize unlocking with the mating connector.

13. An electrical connector, comprising:

an insulating body comprising a wall portion which defines an installation space;

a locking member at least partially installed in the installation space; the locking member comprising a locking arm and a force-receiving portion; the locking arm comprising a hook portion configured to be locked with a mating connector;

a pivot rod installed and fixed to the wall portion and connected with the locking member; and an unlocking device configured to apply a force directly or indirectly to the force-receiving portion, so that the locking arm rotates around the pivot rod to realize unlocking with the mating connector;

wherein the electrical connector further comprises a cover plate installed on the insulating body; the cover plate comprises an abutting elastic arm protruding downwardly; the abutting elastic arm is configured to press against the locking member when in an unlocked position, so as to apply force to the locking arm.

14. An electrical connector, comprising:

an insulating body defining a first slot, a second slot and an installation groove communicating with the first slot and the second slot;

a locking member comprising a first base portion, a second base portion opposite to the first base portion, a first locking arm extending forwardly from the first base portion and received in the first slot, a second locking arm extending forwardly from the second base portion and received in the second slot, and a connecting portion connecting the first base portion and the second base portion; the locking member comprising a force-receiving portion; the first locking arm and the second locking arm comprising a first hook portion and a second hook portion, respectively, for being locked with a mating connector;

a pivot rod connecting the first base portion and the second base portion, the pivot rod being received in the installation groove; and an unlocking device configured to apply a force directly or indirectly to the force-receiving portion, so that the first locking arm and the second locking arm rotate around the pivot rod to realize unlocking with the mating connector;

wherein the unlocking device comprises a drawstring connected to the force-receiving portion;

wherein the electrical connector further comprises a cover plate installed on the insulating body; the cover plate comprises an abutting elastic arm protruding downwardly;

wherein the connecting portion comprises a raised portion located at a rear end of the force-receiving portion and an abutment protrusion extending upwardly from the raised portion; the drawstring passes through the insulating body backwardly from a bottom of the raised portion;

wherein the abutment protrusion is bent upwardly from a rear end edge of the raised portion; the abutment protrusion comprises an arc-shaped surface to mate with the drawstring; and wherein the abutting elastic arm is configured to press against the abutment protrusion.

15. The electrical connector according to claim 14, wherein the first base portion defines a first installation hole; the second base portion defines a second installation hole; one end of the pivot rod passes through the first installation hole, and another end of the pivot rod passes through the second installation hole.

16. The electrical connector according to claim 15, wherein both the first locking arm and the second locking arm are located in a vertical plane and formed by blanking.

17. The electrical connector according to claim 15, wherein the connecting portion connects a bottom of the first base portion and a bottom of the second base portion; the pivot rod is located above the connecting portion.

18. The electrical connector according to claim 15, wherein the connecting portion comprises the force-receiving portion.

* * * * *